United States Patent [19]

Yamamori et al.

[11] Patent Number: 4,587,567
[45] Date of Patent: May 6, 1986

[54] FLAT PICTURE TUBE TELEVISION RECEIVER INCLUDING PICTURE TUBE MOUNTING STRUCTURE

[75] Inventors: Eiji Yamamori, Tokyo; Hiroyuki Suzuki, Inagi, both of Japan

[73] Assignee: Sony Corporation, Tokyo, Japan

[21] Appl. No.: 585,079

[22] Filed: Mar. 1, 1984

[30] Foreign Application Priority Data

Mar. 11, 1983 [JP] Japan .............................. 58-35239[U]
Mar. 18, 1983 [JP] Japan .............................. 58-39246[U]
Mar. 18, 1983 [JP] Japan .............................. 58-39247[U]

[51] Int. Cl.[4] ........................ H04N 5/645; H04N 5/64; H04N 5/44; A47B 81/06
[52] U.S. Cl. ................................... 358/248; 358/254; 358/188; 312/7.2; 340/720
[58] Field of Search .............. 358/188, 248, 242, 254; 340/720; 312/7.2; 313/422, 477

[56] References Cited

PUBLICATIONS

Article from the Washington Post, Sony Corporation's Flat TV, Jan. 28, 1982, p. D14.

Primary Examiner—James J. Groody
Assistant Examiner—E. Anne Toth
Attorney, Agent, or Firm—Lewis H. Eslinger; Alvin Sinderbrand

[57] ABSTRACT

A television receiver having a flat braun tube as its picture tube formed of a tube portion, a funnel portion and a picture display portion in which the picture display portion is coupled integrally through the funnel portion to the tube portion, the back surface of the picture display portion being inclined such that as the back surface goes away from said tube portion, the back surface comes close to the front side of said picture display portion from an axis of said tube portion. A cabinet of substantially flat rectangular parallelepiped shape is used into which the whole of the flat braun tube and electronic circuits thereof are incorporated and a wiring circuit board having thereon at least a part of said electronic circuits is disposed in the cabinet behind the flat braun tube substantially parallel to the axis of the tube portion to define a space between the inclined back surface of the picture display portion and the wiring circuit board to incorporate therein assembly parts of relatively large size.

6 Claims, 5 Drawing Figures

FLAT PICTURE TUBE TELEVISION RECEIVER INCLUDING PICTURE TUBE MOUNTING STRUCTURE

BACKGROUND OF THE INVENTION

1. Field of the Invention

The present invention relates generally to television receivers and more particularly is directed to a novel television receiver having a flat braun tube as its picture tube and a cabinet which is formed as a substantially rectangular paralelepiped shape in which the television receiver circuits including the flat braun tube and batteries are incorporated.

2. Description of the Prior Art

In order to reduce the depth of a television receiver, a flat braun tube has been developed in which the axis of a tube portion with an electron gun incorporated therein is arranged substantially parallel to a picture screen or at an approximately parallel angle with the picture sceen. And, a flat portable type television receiver employing such flat braun tube has been practically used. It is requested for the television receiver of this kind to be formed more compact and especially thinner.

However, there are not a few electronic parts used in the television receiver which are difficult to be compact-sized, except the electronic parts such as a braun tube, a loudspeaker, a battery, a tuner unit and the like which have inherently a limit in being formed compact. For example, although a switch, a large-capacity capacitor and so on are assembly parts mounted on a wiring circuit board, they are quite large-sized as compared with a small signal amplifying transistor, a resistor and an integrated circuit. Such assembly parts become obstacles in forming the television receiver small-size, particularly flat. The reason for this is as follows. In the television receiver employing the flat braun tube, such flat braun tube is disposed immediately inside the front surface of a cabinet, while a wiring circuit board on which a television receiver circuit is formed is disposed behind the braun tube in a substantially parallel relation to the axis of a tube portion of the braun tube. If the parts mounted on the wiring circuit board are large in size, particularly large in height from the wiring circuit board, it is necessary to increase the distance between the picture tube and the wiring circuit board. As a result, the thickness of the television receiver must be increased. This becomes a great obstacle for making the flat television receiver thin. Moreover, in the television receiver of this kind unless the parts thereof are disposed appropriately, the center of gravity of the television received is largely displaced from the center of the cabinet. When the center of gravity of the television reciever is largely displaced from the center of the cabinet, it becomes difficult to support the television receiver. Alternatively, when the television receiver is laid upright on a table or the like by a stand mechanism, the television receiver becomes quite unstable there. In addition, such television receiver has a defect that the flat braun tube is difficult to be supported, thus being unstable.

OBJECTS AND SUMMARY OF THE INVENTION

Accordingly, it is an object of the present invention to provide an improved television receiver.

It is another object of the present invention to provide a novel television receiver which effectively uses a space formed between the rear surface of a flat braun tube and a wiring circuit board to dispose therein parts of relatively large size, thus enabling the television receiver to be formed small and particularly thin in its construction.

It is a still another object of the present invention to provide a novel television receiver in which the center of gravity thereof is positioned near the center of a cabinet to achieve good weight balance without unnecessarily increasing the width of the television receiver.

It is a further object of the present invention to provide a novel television receiver in which a braun tube is supported stably with excellent shock resistance.

It is still further object of the present invention to provide a novel television receiver having a metal support member serving to support a wiring circuit board to a cabinet or as an aide thereof and to connect a conductive coating surface formed on the back surface of a braun tube with the earth pattern formed on the wiring circuit board.

It is a yet further object of the present invention to provide a novel television receiver suitable for being adapted to a portable flat television receiver.

According to one aspect of the present invention, there is provided a television receiver comprising:

a flat braun tube as its picture tube, said flat braun tube being formed of a tube portion, a funnel portion and a picture display portion, said picture display portion being coupled integrally through said funnel portion to said tube portion, the back surface of said picture display portion being inclined such that as the back surface goes apart from said tube portion the back surface comes close to the front side of said picture display portion from an axis of said tube portion;

a cabinet of substantially flat rectangular parallelepiped shape into which the whole of said flat braun tube and electronic circuits thereof are incorporated;

a wiring circuit board having thereon at least a part of said electronic circuits and disposed behind said flat braun tube substantially parallel to the axis of said tube portion to define a space between said inclined back surface of said picture display portion and said wiring circuit board to incorporate therein assembly parts of relatively large size; and means for supporting said flat braun tube and said wiring circuit board with a predetermined relation.

Thus, according to the television receiver of the present invention, the useless space inevitably formed between the picture display portion and the wiring circuit board is effectively used to incorporate therein assembly parts of relatively large size so that the packing density of the television receiver can be increased, therefore, the television receiver of the present invention can be formed small and, particularly, formed thin.

The other objects, features and advantages of the present invention will become apparent from the following description taken in conjunction with the accompanying drawings through which the like references designate the same elements and parts.

DESCRIPTION OF THE PREFERRED EMBODIMENT

An embodiment of the television receiver according to the present invention will hereinafter be described in detail with reference to the attached drawings.

Figure 1:
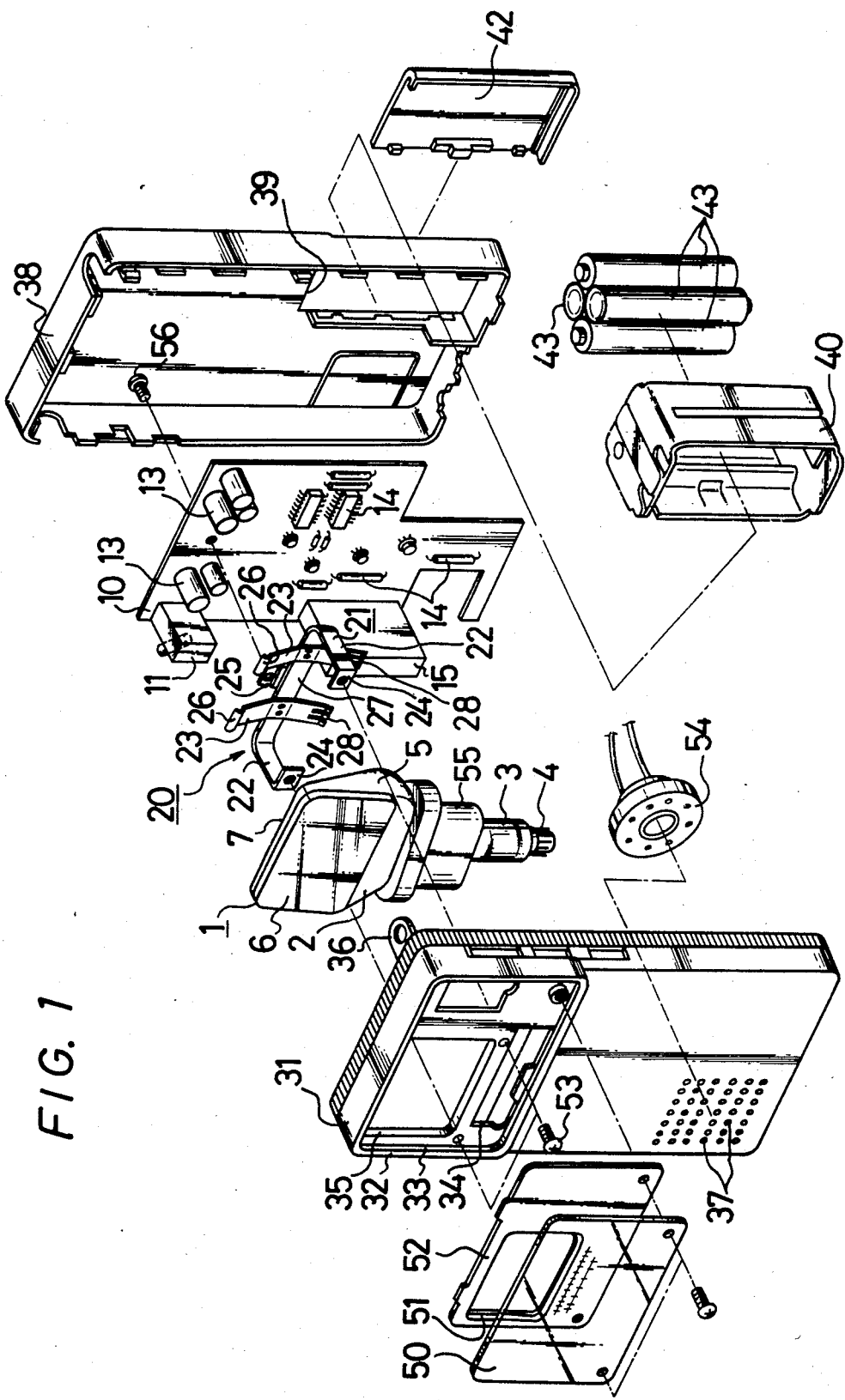
FIG. 1 is an exploded perspective view of an embodiment of the television receiver according to the present invention.

FIG. 1 is a diagram showing the overall of a television receiver of the present invention in exploded state. As shown in FIG. 1, a cabinet of this television receiver is formed such that a substantially flat rectangular parallelepiped front cabinet or casing member 31 and a rear cabinet or casing member 38 are superposed upon one another at their peripheral edges to be bonded together.

A reference numeral 32 designates a protruded strip which is formed on the front surface of the front casing member 31 so as to surround substantially the upper half portion thereof. A screen frame 52 and an optical filter 50 are disposed in an area 33 surrounded by the protruded stripe 32. Within the area 33 of the front casing member 31, there are disposed necessary windows such as a screen window 35 to which a picture display portion 6 of a braun tube 1 is faced, a tuning indication window 34 formed rectangular under the screen window 35 along its under side to indicate a selected channel and so on. Through the screen frame 52 is formed a window 51 corresponding to the screen window 35. The center of the screen window 35 is displaced to the left side from the center of the area 33 as seen from the front surface. The left side edge of the screen window 35 is positioned near the left side surface of the cabinet 1 so that the braun tube 1 is disposed to deviate from the center of the cabinet to the upper left corner, thus making the upper left corner portion of the picture screen 6 of the braun tube 1 close to that corner portion of the cabinet.

A large number of small apertures 37 are formed through the lower left corner portion of the front casing member 31 to pass therethrough a sound emanated from a loudspeaker 54, while the loudspeaker 54 is disposed at the inner surface of the lower left corner portion of the front casing member 31.

The braun tube 1 is formed flat which comprises a tube portion 3, the picture display portion 6 and a funnel portion 2. The tube portion 3 is made of glass to be cylindrical into which an electron gun (not shown) is sealed from the lower end of the funnel portion 2.

A reference numeral 4 designates a terminal of the braun tube 1 to which a connector is connected to connect the braun tube 1 with the inside circuit of the cabinet. The funnel portion 2 is made of glass and formed as a sector shape in which the lower end opening is made small, while the upper end opening is made large. The upper end of the tube portion 3 is bonded by melt to the lower end opening portion of the funnel portion 2 to connect the tube portion 3 and the funnel portion 2 integrally. The picture display portion 6 comprises a rear panel 5 made of glass and a front panel made of glass similar to the rear panel 5. On the back surface of the rear panel 5 is formed a conductive coating surface 7. The conductive coating surface 7 is formed by bonding, for example, a carbon sheet. In this case, the conductive coating surface 7 can be formed by other appropriate means.

The rear panel 5 and the front panel are bonded together to form the picture display portion 6 and the lower end opening of the picture display portion 6 is made in contact with the upper end opening portion of the funnel portion 2, which then are bonded together by melt, thus the braun tube 1 being constructed. It is, however, needless to say that the above construction elements can be formed integrally in the beginning. In the braun tube 1, the back surface of the rear panel 5 is inclined such that the upper end thereof is displaced to the front. Accordingly, if the braun tube 1 is seen from its side surface, the back surface of the rear panel 5 and the back surface of the funnel portion 2 are connected as substantially L-shaped seen from the right side thereof.

A reference numeral 55 designates a deflecting yoke disposed so as to surround the upper end portion of the tube portion 3 and the lower end portion of the funnel portion 2.

A reference numeral 20 generally designates a braun tube support member which comprises a metal support member 21 and two support springs 23. The metal support member 21 is made of a conductive material such as a steel plate or the like, in which a pair of leg pieces 22 extended in parallel to each other with a distance or spacing therebetween and a connecting member 27 connecting the rear ends of the pair of leg pieces 22 are formed integrally. The distance between the pair of leg pieces 22 is selected to be substantially equal to the width of the portion to be supported of the braun tube 1, namely, in this embodiment, the width near the portion in which the picture display portion 6 and the funnel portion 2 are connected together. The length of each of the leg pieces 22 is selected to be a little longer than the thickness of the supported portion of the braun tube 1, namely, in this embodiment, the depth of the portion in which the picture display portion 6 and the funnel portion 2 are connected together. Reference numeral 24 designates mounting pieces formed at the tip ends of the pair of leg pieces 22, while a reference numeral 25 designates a mounting piece formed on the connecting portion 27 at its substantially central portion such that it is protruded slightly to the backward.

The support springs 23 are each made of a conductive material having resilience, which are curved a little from its central portion to make the form of the side surface equal to substantially L-shape. On the lower ends of the support springs 23 are formed several slits along the longitudinal direction thereof to form a plurality of contact pieces 28. The support springs 23 are fixed to the connecting member 27 of the metal support member 21 at their central portions by appropriate means such as riveting or the like in such a manner that both end portions 26 and the contact pieces 28 thereof are positioned to the front side and that their longitudinal directions are perpendicular to the longitudinal direction of the connecting member 27 of the metal support member 21, thus the braun tube support member 20 being formed.

The braun tube 1 is supported to the front casing member 31 as follows.

The braun tube 1 is positioned so as to make the connected portion thereof where the picture display portion 6 and the funnel portion 2 are connected together lie within the metal support member 21. In other words, the leg pieces 22 are positioned along both side portions of the portion in which the picture display portion 6 and the funnel portion 2 are connected together, while the connecting member 27 is positioned with a small spacing relative to the rear connecting portion of the picture display portion 6 with the funnel portion 2. Under this state, the mounting pieces 24 formed on the tip ends of the pair of leg pieces 22 of the metal support member 21 are fixed to the front casing member 31 by screws 53. Then, the upper ends 26 of the support springs 23 fixed to the metal support member 21 contact resiliently with the conductive coating surface 7 formed on the back surface of the braun tube 1, while the contact pieces 28 formed at the lower ends of the support springs 23 contact resiliently with the back surface of the funnel portion 2 of the braun tube 1. As described above, since both the tip ends and the contact pieces 28 contact resiliently with the back surface of the braun tube 1, the picture display portion 6 of the braun tube 1 contacts closely with the inner surface of the front casing member 31 so as to cover the screen window 35 from the inside. Thus, under such state, the braun tube 1 is supported to the front casing member 31 through the braun tube support member 20.

The reason why the lower ends of the support springs 23 are both split into the plurality of contact pieces 28 is as follows. Since the portion of the back surface of the braun tube 1 with which the lower ends of the support springs 23 are in contact is curved considerably, it is desired that the whole of the lower ends of the support springs 23 can be in resilient contact with the above contact portion of the braun tube 1 at its back surface with strength as uniform as possible. On the other hand, since the back surface of the rear panel 5 of the braun tube 1 is not curved so much, it is not necessary that the upper ends of the support springs 23 which contact resiliently with the above contact portion are split to form contact pieces 28.

Figure 2:
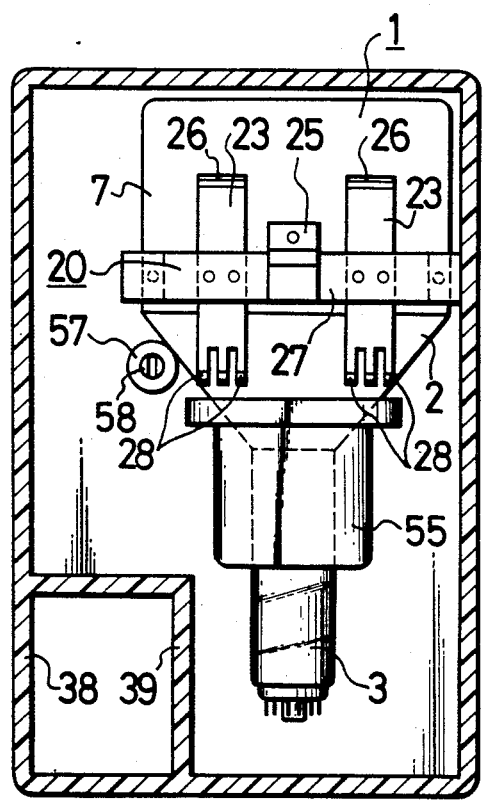
FIG. 2 is a longitudinally cross-sectional view illustrating the rear portion of the overall construction thereof.
Figure 4:
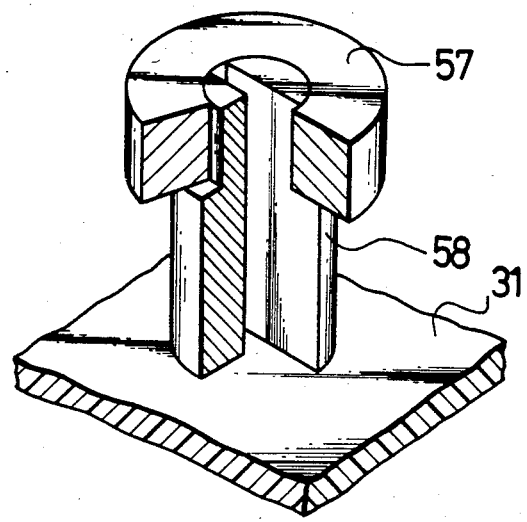
FIG. 4 is a partially cut-out perspective view showing another main part thereof.

In FIGS. 2 and 4, a reference numeral 58 designates a boss which protrudes from and is formed integrally with the inner surface of the front casing member 31. To the free end of the boss 58 is attached an annular elastic cushion member 57 made of rubber and this rubber elastic cushion member 57 is located in contact with the side surface of the funnel portion 2 of the braun tube 1. When such rubber elastic cushion member 57 contacts with the side surface of the funnel portion 2, the braun tube 1 can be supported to the front casing member 31 more stably.

In the figures, reference numeral 10 designates a wiring circuit board on which various circuit elements necessary for the television receiver are formed. The wiring circuit board 10 is connected to the mounting piece 25 of the metal support member 21 by a screw 56. The screw 56 is made of conductive material, which is therefore connected electrically to the earth pattern formed on the wiring circuit board 10. In consequence, the conductive coating surface 7 formed on the back surface of the picture display portion 6 of the braun tube 1 is connected through the support springs 23—the metal support member 21—the screw 56 to the earth pattern formed on the wiring circuit board 10. When the screw 56 is screwed into the mounting piece 25 of the metal support member 21, the wiring circuit board 10 can be supported, too. When the support of the wiring circuit board 10 is unsatisfactory by only screwing the screw 56 into the mounting piece 25, the wiring circuit board 10 must be supported by the front casing member 31 at another place. At any rate, it is confirmed that when the screw 56 is screwed into the mounting piece 25, the support work for supporting the wiring circuit board 10 to the front casing 31 can be made easy.

The rear casing member 38 is coupled to the front casing member 31 to form the cabinet in which predetermined assembly parts necessary for the television receiver are disposed.

According to the above support structure for the braun tube 1, the picture display portion 6 of the braun tube 1 is pressed at its back surface resiliently by the support springs 23 of the braun tube support member 20 so that the picture display portion 6 is urged at its front surface against the inner surface of the front casing member 31. Thus, even if the dimension of the braun tube 1 deviates a little, the stability in supporting the braun tube 1 within the cabinet is not disturbed at all. Moreover, in the embodiment of the present invention, since the support springs 23 are formed as L-shape which corresponds to the L-shape formed from the picture display portion 6 at the back surface of the braun tube 1 to its funnel portion 2, the braun tube 1 can be prevented from being displaced in the up and down direction thereby. Further, the braun tube 1 can also be prevented from being displaced in the left to right direction by the pair of leg pieces 22 of the metal support member 21 so that the braun tube 1 is never moved within the cabinet or front and rear casing members 31 and 38. Thus, the support state of the braun tube 1 in the cabinet is quite stable. When impact is applied to the cabinet, such impact can be absorbed by the resiliency of the support springs 23 and the rubber elastic member 57. Furthermore, the braun tube support member 20 according to the braun tube support structure in the above embodiment of the present invention serves not only to support the braun tube 1 to the cabinet but also to be used as earthing means for the braun tube 1 and, in addition, support means for the wiring circuit board 10. Accordingly, it is possible to reduce the number of assembly parts required as these means in the prior art and therefore the structure of the television receiver can be simplified and the manufacturing cost thereof can be decreased.

In the figures, a reference numeral 40 designates a battery holder which is detachably disposed in the lower right portion of the cabinet and a reference numeral 39 designates an insertion window for the battery holder 40 formed through the lower right portion of the rear casing member 38. A reference numeral 42 designates a lid by which the battery holder insertion window 39 can be opened and/or closed freely. Within the battery holder 40 are held four batteries 43 in the vertical direction, and the contacts formed in the battery holder 40 are connected through the battery contact pieces formed on the wiring circuit board 10 to the television receiver circuit elements and hence the four batteries 43 function as the voltage source. The four batteries 43 held in the battery holder 40 weigh about the same as the flat braun tube 1 in total weight. While the braun tube 1 is disposed at the position near the upper left corner from the center of the cabinet, the battery holder 40 is positioned at the lower right corner portion of the cabinet which forms the diagonal relative to the upper left corner, making the center of gravity of the television receiver close to the center of the cabinet.

In the television receiver of this kind, the braun tube 1 weighs most and all the batteries, namely, four batteries 43 weigh as much as the braun tube 1. Accordingly, the positional relation between the braun tube 1 and the four batteries 43 becomes a large factor which determines the position of the center of gravity of the television receiver. Depending on the positional relation therebetween, the center of gravity of the television receiver is displaced greatly from the center of the television receiver to its one side. As a result, when the television receiver is laid upright by a stand or the like, the television receiver is apt to fall to the side in which the center of gravity thereof is displaced by the displaced center of gravity so that the support state of the television receiver done by the stand or the like becomes significantly unstable.

However, in the television receiver of the present invention, the braun tube 1 is disposed at the position displaced close to one corner from the center of the cabinet as seen from the front surface of the cabinet and the four batteries 43 are disposed at the corner portion which forms the diagonal with the above one corner. Therefore, it is not necessary to increase the transverse width of the cabinet.

Figure 3:
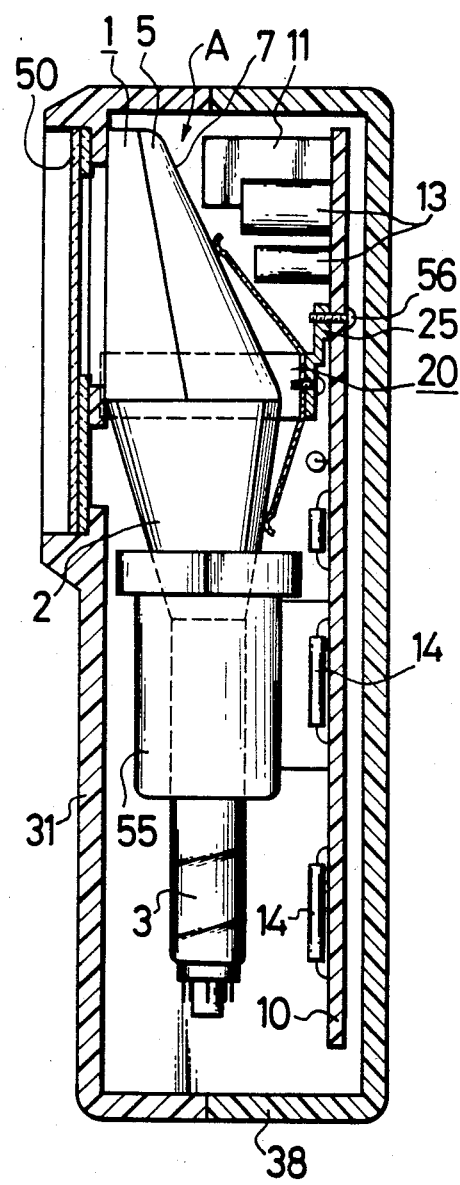
FIG. 3 is a longitudinally cross-sectional side view illustrating a main part thereof.

Between the rear panel 5 of the braun tube 1 and the wiring circuit board 10 is formed a space A which has a right-angled triangular shape seen from its one side as shown in FIG. 3. Because, as described before, the conductive coating surface 7 of the braun tube 1 is inclined with an inclination such that the upper end thereof is displaced to the front side relative to the axis of the tube portion 3. On the other hand, the wiring circuit board 10 is fixed by the screw 56 to the wiring circuit board mounting piece 25 formed on the braun tube support member 20 with its assembly part mounting surface facing to the front behind the braun tube 1 substantially parallel to the axis of the tube portion 3. Accordingly, between the conductive coating surface 7 of the braun tube 1 and the assembly part mounting surface of the wiring circuit board 10 is formed the relatively large space A the side shape of which is the right-angled triangular shape as set forth above. Although the space A is inherently useless space, the television receiver of the present invention uses effectively such space A as the area to incorporate therein the assembly parts of relatively large size such as a switch 11, large-capacity capacitors 13 and the like.

Although the electronic parts used in the television receiver are generally small ones such as typically shown at 14 such as ordinary transistors, resistors, integrated circuits and so on, there are not a few large-sized parts. Except the parts such as the braun tube, the loudspeaker, the battery or the like which cannot be compact-sized too much inherently, there are the parts such as the switch 11, the large-capacity capacitors 13 or the like which are quite large in size as compared with small parts 14 such as small signal transistors, resistors and the like. Therefore, in the present invention, the relatively large-sized parts 11, 13 ... are disposed within the large space, namely, the triangular shape space A formed between the back surface of the rear panel 5 of the braun tube 1 and the electronic part mounting surface of the wiring circuit board 10, while the small-sized parts 14 such as the transistors, the resistors, the integrated circuit and the like are disposed within the space at the wiring circuit board 10 behind the funnel portion 2 of the braun tube 1, the deflecting yoke 55 and the tube portion 3.

Thus, since the space A which becomes useless inherently is used effectively as the area in which the electronic parts 11, 13, ... of relatively large size are disposed, the packing density of the television receiver can be increased, thus enabling the television receiver to be formed small, particularly thin in its construction.

Figure 5:
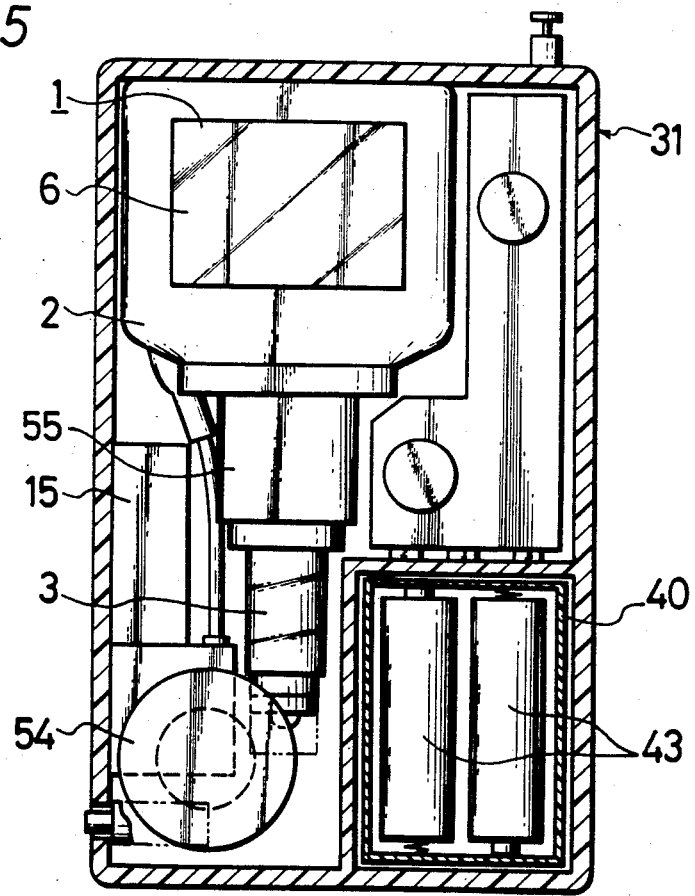
FIG. 5 is a longitudinally cross-sectional front view of the cabinet used in the television receiver of the present invention.

In FIG. 5, a reference numeral 15 designates a tuner unit mounted on the wiring circuit board 10. This tuner unit 15 is disposed at the position displaced from the braun tube 1 to the left side as viewed from the front surface of the part mounting surface of the wiring circuit board 10. The front end portion of the tuner unit 15 is positioned at the left side of the deflecting yoke 55.

As set forth above, according to the television receiver of the present invention, since the space which is inevitably formed between the rear surface of the picture display portion and the wiring circuit board and which is apt to be useless is effectively used as the area to incorporate therein the relatively large-sized parts, the packing density of the television receiver can be increased, thus enabling the television receiver to be formed small in size and thin in its construction.

The electronic parts of relatively large size, which are disposed within the space formed between the rear surface of the picture display portion of the braun tube and the wiring circuit board, are not only the switch and the large-capacity capacitor but also may be a jack, an output transistor of large size. Therefore, the electronic parts disposed within the space are not limited to the switch and the capacitor of large capacity.

Not only the electronic parts mounted on the wiring circuit board are disposed within the above space but also those which are fixed to the cabinet by other appropriate means, for example, screwing may be disposed within the above space.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A television receiver comprising:
a flat braun picture tube being formed of a tube portion, a funnel portion and a picture display portion, said picture display portion being coupled through said funnel surface to said tube portion, an outer rear surface of said picture display portion being inclined relative to the longitudinal axis of said tube portion such that the distal end of said rear surface relative to said funnel portion is proximate the front side of said picture display portion;
a cabinet of substantially flat rectangular parallelepiped shape and of a size to enclose the whole of said flat braun tube and electronic circuits thereof;
a wiring circuit board including a conductive pattern and having thereon at least a part of said electronic circuits and disposed behind said flat braun tube substantially parallel to a longitudinal axis of said tube portion, thereby to define a space between said inclined outer rear surface of said picture display portion and said wiring circuit board for arranging therein assembly parts of said receiver of large size; and means for supporting said flat braun tube and said wiring circuit board with a predetermined relation inside said cabinet and including a U-shaped metal support member having a distance between legs of the U substantially equal to a width of said picture display portion, elongate spring elements affixed to said U-shaped support member in mutually spaced-apart relationship and being arranged such that ends of said elongate spring elements contact a conductive coating formed on said outer rear surface of said picture tube, and an electrical conductor element for electrically connecting said spring elements to said conductive pattern on said circuit board.

2. A television receiver according to claim 1, in which said flat braun tube is so disposed that a corner formed between an upper edge and a side edge of said picture display portion is close to one corner of a front surface of said cabinet and batteries for a power source are disposed at a corner portion which forms a diagonal with said corner of said cabinet.

3. A television receiver comprising:
a flat braun picture tube being formed of a tube portion, a funnel portion and a picture display portion, said picture display portion being coupled through said funnel portion to said tube portion, an outer rear surface of said picture display portion being inclined relative to the longitudinal axis of said tube portion such that the distal end of said rear surface relative to said funnel portion is proximate the front side of said picture display portion;

a cabinet of substantially flat rectangular parallelepiped shape and of a size to enclose the whole of said flat braun tube and electronic circuits thereof;

a wiring circuit board having thereon at least a part of said electronic circuits and disposed behind said flat braun tube substantially parallel to a longitudinal axis of said tube portion, thereby to define a space between said inclined outer rear surface of said picture display portion and said wiring circuit board for arranging therein assembly parts of said receiver of large size; and means for supporting said flat braun tube and said wiring circuit board with a predetermined relation inside said cabinet including a metal support member made of conductive material which consists of a pair of leg pieces extending substantially parallel to each other with a spacing approximately equal to a width of a portion of said flat braun picture tube to be supported and a connection member connecting said pair of leg pieces at their rear ends to each other to form substantially a U-shape, and a pair of support springs made of conductive material having resilience and fixed at their middle portions to the connection member of said metal support member, said pair of support springs being in resilient contact at their tip ends with the back surface of said flat braun picture tube coated with a coating material, said pair of legs being fixed to said cabinet such that said flat braun tube is positioned between said pair of leg pieces, said metal support member being fixed to said wiring circuit board affixed inside said cabinet, and said metal support member being electrically connected to an earth pattern formed on said wiring circuit board.

4. A television receiver comprising;
a flat picture tube including a tube portion coupled to a funnel portion coupled to a picture display portion, a rear exterior surface of said picture display portion being inclined relative to the longitudinal axis of said tube portion such that the distal edge of said rear surface relative to said funnel portion is closer to a flat front surface of said picture display portion than the proximal edge of said rear exterior surface;

a circuit board having arranged thereon electronic circuit components of the television receiver and disposed behind and substantially parallel to the flat front surface of said picture display portion thereby to define a space between said inclined rear exterior surface of said picture display portion and said circuit board to accommodate additional circuit elements in said space;

a hollow, substantially flat, rectangular parallelepiped cabinet into which said flat picture tube and said circuit board having said electronic circuit components and additional circuit elements thereon are arranged; and means for supporting said flat picture tube and circuit board within said cabinet in a predetermined spatial relationship including a metal support member having two elongated spring elements affixed in spaced-apart relationship at respective midpoints to said metal support member, ends of each of said elongated spring elements being in contact with said rear exterior surface of said picture tube, and selected ones of said ends of said spring members being formed with contact fingers for contacting rear exterior surface.

5. A televison receiver according to claim 4, in which said flat picture tube is arranged within said rectangular parallelepiped cabinet at a first preselected corner and further comprising batteries for electrically powering said television receiver, and means for mounting said batteries in a second preselected corner of said cabinet that is diagonally opposed to said first preselected corner.

6. A television receiver comprising:
a flat picture tube including a tube portion coupled to a funnel portion coupled to a picture display portion, a rear exterior surface of said picture display portion being inclined relative to the longitudinal axis of said tube portion such that the distal edge of said rear surface relative to said funnel portion is closer to a flat front surface of said picture display portion than the proximal edge of said rear exterior surface;

a circuit board having arranged thereon electronic circuit components of the television receiver and disposed behind and substantially parallel to the flat front surface of said picture display portion thereby to define a space between said inclined rear exterior surface of said picture display portion and said circuit board to accommodate additional circuit elements in said space;

a hollow, substantially flat, rectangular parallelepiped cabinet into which said flat picture tube and said circuit board having said electronic circuit components and additional circuit elements thereon are arranged; and means for supporting said flat picture tube and said circuit board within said cabinet in a predetermined spatial relationship including a U-shaped support member including a pair of leg pieces extending substantially parallel to each other with a spacing substantially equal to a width of said picture display portion and being connected at rear ends thereof by a connection member, and a pair of electrically conductive support springs being attached at middle portions thereof to said connection member and the ends of said support springs being in resilient contact with said inclined rear exterior surface of said picture display portion, and means for affixing free ends of said leg pieces to said cabinet, whereby said flat picture tube is arranged between said pair of leg pieces and said metal support member is attached to said circuit board such that said metal support member is electrically connected to an electrical ground pattern formed on said circuit board.

* * * * *